(12) United States Patent
Clemen et al.

(10) Patent No.: US 9,279,587 B2
(45) Date of Patent: Mar. 8, 2016

(54) DEVICE FOR MIXING FUEL AND AIR OF A JET ENGINE

(75) Inventors: Carsten Clemen, Mittenwalde (DE); Waldemar Lazik, Teltow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1000 days.

(21) Appl. No.: 13/431,363

(22) Filed: Mar. 27, 2012

(65) Prior Publication Data

US 2012/0247110 A1 Oct. 4, 2012

(30) Foreign Application Priority Data

Mar. 28, 2011 (DE) .......................... 10 2011 006 241

(51) Int. Cl.
*F23R 3/16* (2006.01)
*F02K 1/38* (2006.01)
*F02K 3/10* (2006.01)
*F23D 14/62* (2006.01)
*F23R 3/28* (2006.01)

(52) U.S. Cl.
CPC . *F23R 3/16* (2013.01); *F02K 1/386* (2013.01); *F02K 3/10* (2013.01); *F23D 14/62* (2013.01); *F23R 3/286* (2013.01); *F23D 2900/00003* (2013.01); *F23D 2900/14021* (2013.01)

(58) Field of Classification Search
CPC ................. F02K 1/386; F23D 14/62; F23D 2900/14021; F23D 2900/00003; F23R 3/286; F23R 3/16; F23R 3/12; F23R 3/14; B05B 7/10
USPC ..................... 60/737, 740, 748; 239/403–406
See application file for complete search history.

(56) References Cited

U.S. PATENT DOCUMENTS

| 3,930,370 | A | 1/1976 | Markowski et al. |
| 4,364,522 | A | 12/1982 | Reider |
| 5,647,200 | A | 7/1997 | Althaus |
| 6,640,537 | B2 | 11/2003 | Tse |
| 7,780,151 | B2 * | 8/2010 | Carroni ........................ 261/79.1 |

FOREIGN PATENT DOCUMENTS

| CH | 586847 | 4/1977 |
| DE | 768004 | 5/1955 |
| DE | 3200464 | 7/1983 |
| DE | 4406399 | 10/1994 |
| DE | 60120754 | 5/2007 |

OTHER PUBLICATIONS

German Search Report dated Feb. 10, 2012 from counterpart German patent application.

* cited by examiner

*Primary Examiner* — Phutthiwat Wongwian
*Assistant Examiner* — Stefan Ibroni
(74) *Attorney, Agent, or Firm* — Timothy J. Klima; Shuttleworth & Ingersoll, PLC

(57) ABSTRACT

A device for mixing fuel and air of a jet engine includes at least one air-carrying duct and at least one further fuel-carrying duct. Guide elements extending over the duct height and distributed over the circumference of the duct are provided at least in the air-carrying duct, in the area of which guide elements a twist can be imparted to the air flowing in the air-carrying duct in order to improve mixing between the air and the fuel downstream of the ducts. The guide elements are provided at a trailing edge with at least one downstream extending projection and/or upstream extending recess designed at least approximately or at least in some areas with a sharp edge.

20 Claims, 4 Drawing Sheets

DEVICE FOR MIXING FUEL AND AIR OF A JET ENGINE

Figure 1:
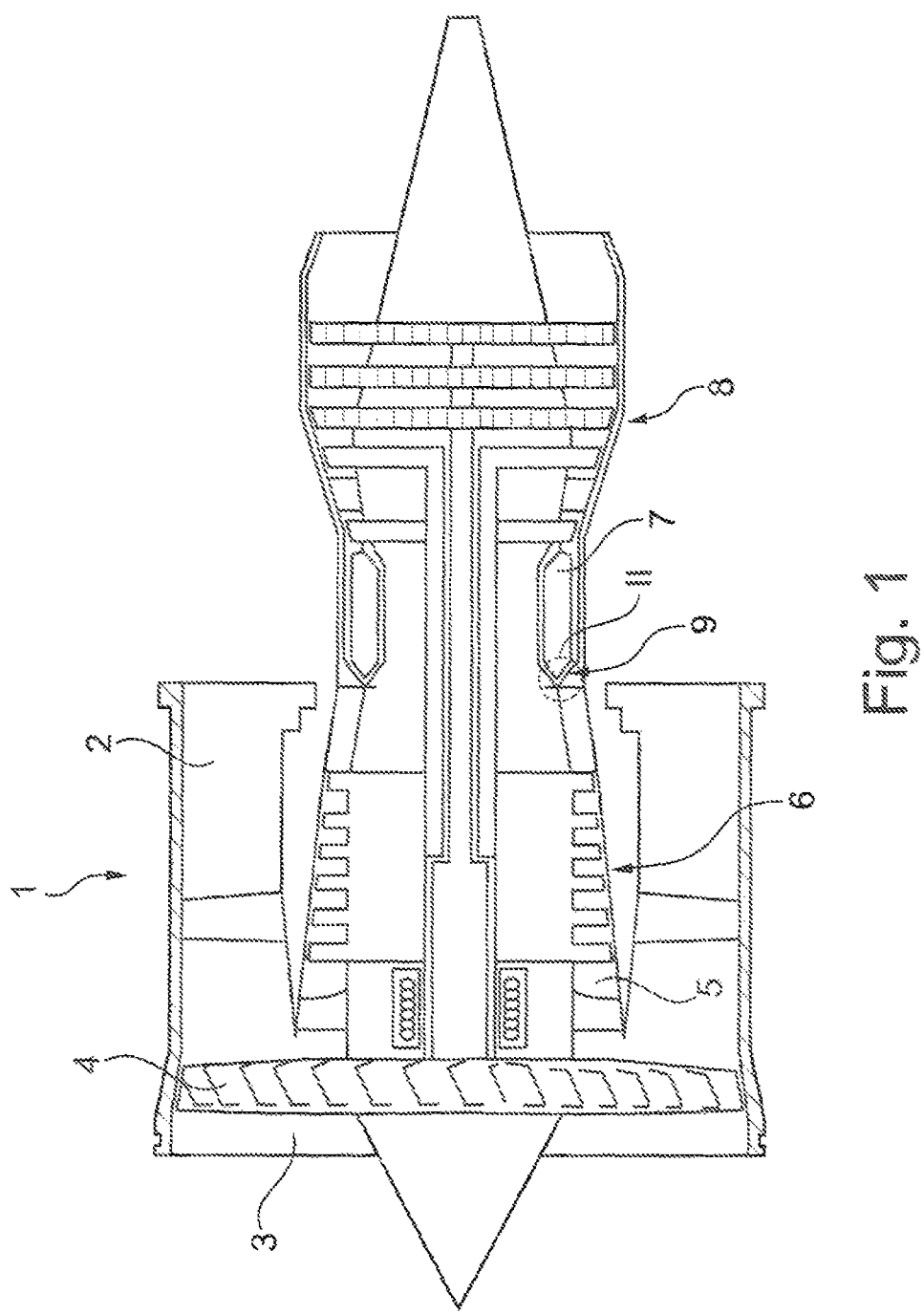

This application claims priority to German Patent Application DE102011006241.6 filed Mar. 28, 2011, the entirety of which is incorporated by reference herein.

This invention relates to a device for mixing fuel and air of a jet engine.

Jet engines or gas turbines known from actual practice operate on the principle of recoil drive. During operation, jet engines absorb the ambient air and emit combustion products and partly air as a hot propulsion jet, with a thrust being generated by the recoil. The absorbed ambient air is compressed in the area of a compressor. In a following combustion chamber, the fuel, as a rule kerosene, is injected into the airflow and then combusted in the combustion chamber. When the engine is started, the air/fuel mixture is ignited by igniter plugs in the combustion chamber. The combustion of the air/fuel mixture present in the combustion chamber is then continuous without external ignition.

So-called annular combustion chamber arrangements represent a gas-dynamic optimum for jet engines. They are very easy to implement and have a small installation space requirement in the axial direction of a jet engine, since no diversions of the mixture to be combusted in the combustion chamber have to be provided between a compressor and a turbine of a jet engine. Several fuel injection valves or devices for mixing fuel and air, also known as burners, are provided upstream of the combustion chamber, using which valves and devices the fuel is mixed with an airflow and is introduced into an annular combustion space.

In the area of the devices for mixing air and fuel, the latter are passed through several ducts, with the airflow routed within the jet engine being imparted with a twist by guide elements in the area of the device in order to ensure mixing between the air and the fuel. The guide elements generally represent profiled cascades, which are also known from compressor or turbine technology. There can be any number of them on the circumference of the burner and several rows of such guide elements can be employed, depending on how many air ducts are available for mixing. The trailing edges of the guide elements facing away in the flow direction of the airflow are designed straight and thin to ensure a low-loss outflow of the flow around the profiles or an unobstructed flow around the guide elements.

The drawback however is that during operation of jet engines, fuel collects and an even mixing of air and fuel is not achieved in so-called wake areas of the guide elements present downstream of the trailing edges of the guide elements relative to the airflow direction. Outside the wake areas, fuel and air are thoroughly mixed. The unwelcome fuel accumulation in the wake areas, which are also referred to as wake zones, results from the fact that the flow velocity in the wake areas is almost zero. The thorough mixing between the airflow and the fuel is particularly hindered in that a shear layer is created between the unobstructed flow and the wake areas that prevents thorough mixing of both zones.

The object underlying the present invention is therefore to provide a device for mixing fuel and air of a jet engine, using which a thorough mixing between air and fuel is achieved and the accumulation of fuel in wake areas of guide elements is avoided by simple design measures.

In the device in accordance with the invention for mixing fuel and air of a jet engine having at least one air-carrying duct and at least one further fuel-carrying duct, guide elements extending over the duct height and distributed over the circumference of the duct are provided at least in the air-carrying duct, in the area of which guide elements a twist can be imparted to the air flowing in the air-carrying duct in order to improve mixing between the air and the fuel downstream of the ducts.

To prevent fuel accumulations in wake areas downstream of the guide elements, the guide elements are designed in an end area, which is at the rear relative to a flow direction of the air, with, relative to the flow direction, at least one projection and/or recess designed at least approximately or at least in some areas with a sharp edge. Hence, the guide elements have at least in some areas a preferably serrated trailing edge in order to generate downstream of the guide elements so-called trailing edge vortices and to achieve an improved mixing of air and fuel. The trailing edge vortices prevent the accumulation of fuel as known from actual practice in wake areas of the guide elements, thus achieving an improved mixing of air and fuel and hence also an improved combustion of the air/fuel mixture in the area of a combustion chamber downstream of the device.

A particularly good mixing between air and fuel is achieved when the at least one projection and/or recess of the guide elements is designed triangular at least in some areas, since with a design of this type of the guide elements the trailing edge vortices are present to an extent assuring a high degree of mixing during operation of a jet engine.

A good mixing of air and fuel is also achieved when the at least one projection and/or recess of the guide elements is designed trapezoidal at least in some areas.

Depending on the respective application, it is also possible, in order to achieve a thorough mixing of air and fuel, to design the guide elements with several projections and recesses, the shape and spacing of which from one another at least partly vary.

Again depending on the respective application, it is also possible to design the guide elements with several projections and recesses, the shape and spacing of which from one another are identical.

In a further advantageous embodiment favorable in terms of installation space, the air-carrying duct is designed as an annular duct and surrounds the fuel-carrying duct.

If two concentrically arranged air-carrying ducts each designed as an annular duct are provided and surround the fuel-carrying duct, the device in accordance with the invention also has a low installation space requirement.

The features stated herein, as in the following embodiments of the device in accordance with the invention, are each suitable, singly or in any combination with one another, to develop the subject matter of the invention. The respective feature combinations do not represent any restriction with regard to the development of the subject matter in accordance with the invention, but have substantially only an exemplary character.

Figure 3:
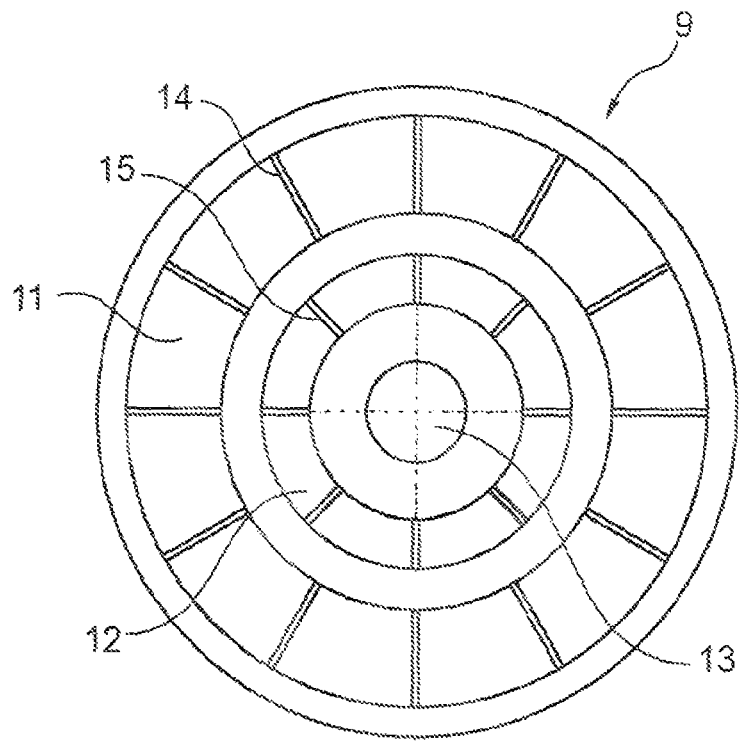
Figure 4:
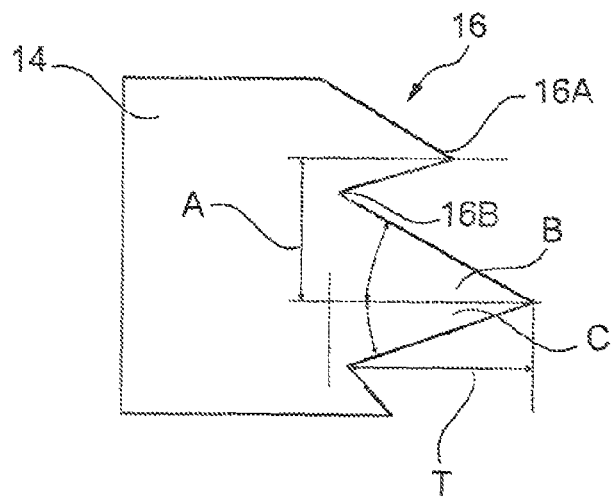
Figure 5:
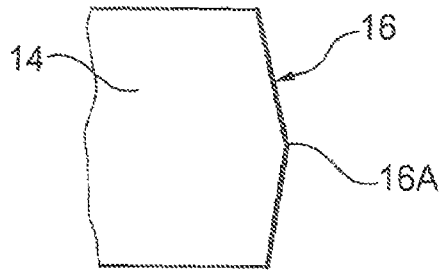
Figure 6:
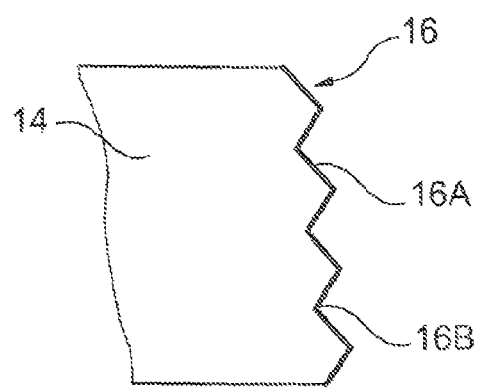
Figure 7:
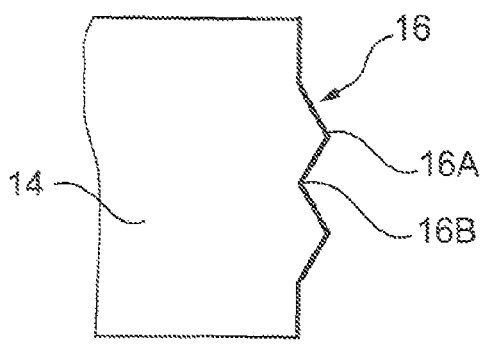
Figure 8:
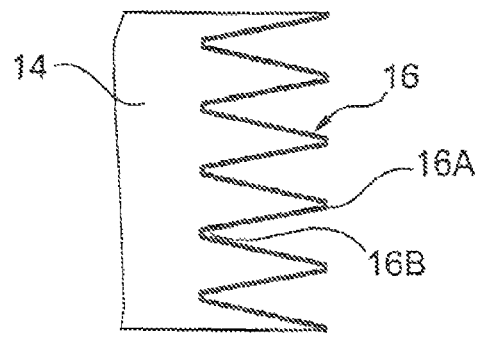
Figure 9:
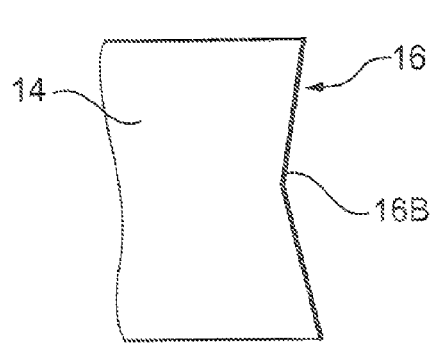
Figure 10:
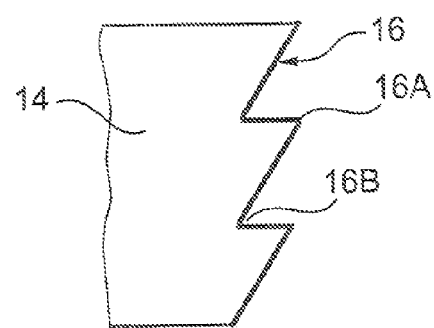
Figure 11:
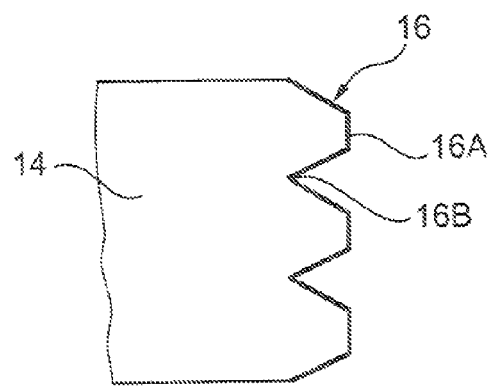
Figure 12:
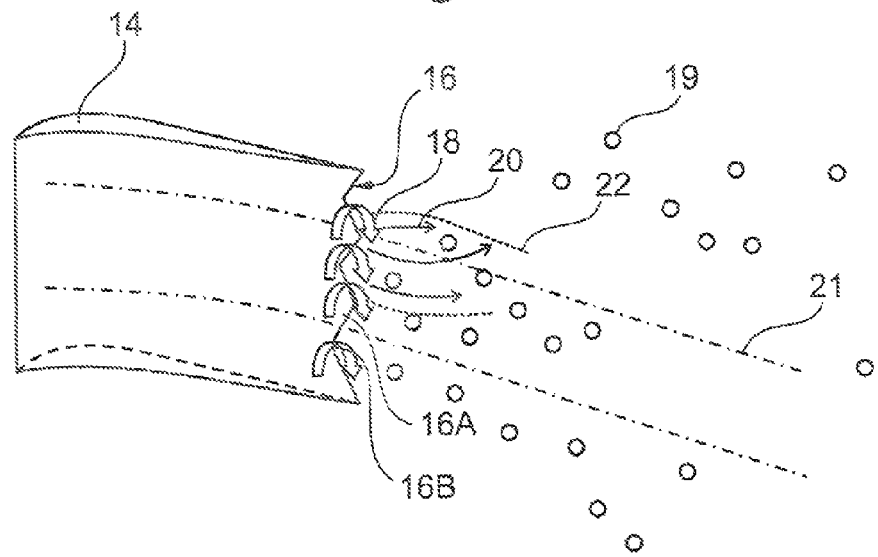

Further advantages and advantageous embodiments of the device in accordance with the present invention will be apparent from the embodiments described in principle in the following with reference to the accompanying drawings. In the drawings, FIG. 1 shows a highly schematized longitudinal sectional view of a jet engine provided with a device for mixing fuel and air, FIG. 2 shows an enlarged partial representation of an area II characterized in greater detail in FIG. 1 and including the device for mixing air and fuel, FIG. 3 shows a side view of the device for mixing air and fuel, in single representation, FIG. 4 shows a schematized single side view of a guide element of the device for mixing air and fuel, FIG. 5 to FIG. 11 show several representations of different embodiments of guide elements corresponding to FIG. 4, and FIG. 12 shows a simplified three-dimensional single view of a guide element.

FIG. 1 shows a longitudinal sectional view of a jet engine 1 designed with a bypass duct 2. Furthermore, the jet engine 1 is designed with an inlet area 3 adjoined downstream by a fan 4 in a manner known per se. Again downstream of the fan 4, the fluid flow in the jet engine 1 splits into a bypass flow and a core flow, with the bypass flow flowing through the bypass duct 2 and the core flow into an engine core 5, which is designed once again in a manner known per se with a compressor arrangement 6, a burner 7 and a turbine arrangement 8.

On the flow inlet side, the burner 7 is designed with a device 9 for mixing fuel and air which is provided in an area II shown in greater detail in FIG. 1.

Figure 2:
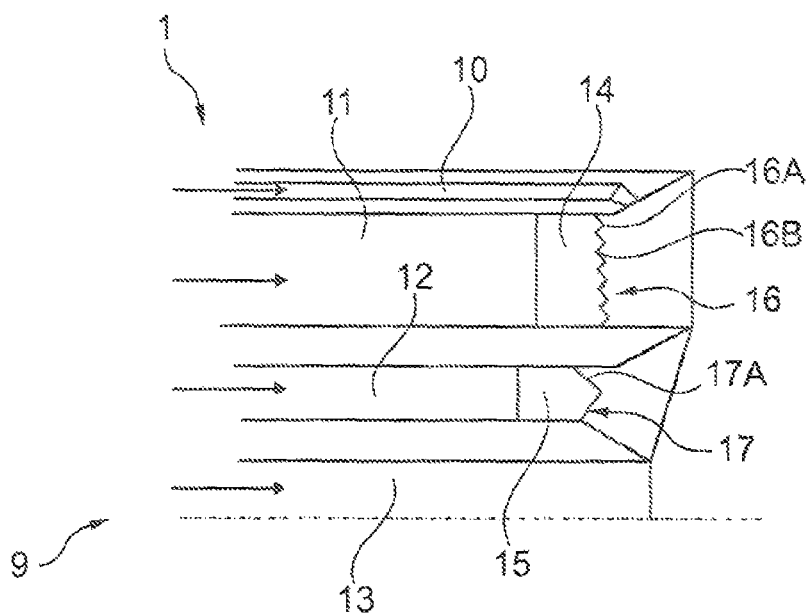

FIG. 2 shows an enlarged partial view of the area II characterized in greater detail in FIG. 1 and including the device 9. From the illustration according to FIG. 2, it is clear that the device 9 for mixing fuel and air of the jet engine 1 is designed with several air-carrying ducts 11 and 12 and two fuel-carrying ducts 10 and 13. In the air-carrying ducts 11 and 12, guide elements 14, 15 are provided which here extend over the duct height of ducts 11 and 12 and in a manner shown in greater detail in FIG. 3 are distributed over the circumference of the ducts 11 and 12, in the area of which guide elements the air flowing in the air-carrying ducts 11 and 12 can be imparted with a twist for improvement of mixing between the air and the fuel downstream of the ducts 11 and 12.

The guide elements 14 and 15 arranged in the ducts 11 and 12 are provided in an end area, which is at the rear in the flow direction of the air or in the area of a trailing edge 16, 17, in each case with, relative to the flow direction in the manner shown in greater detail in FIG. 2 and in FIGS. 4 to 12, at least one downstream extending projection 16A or 17A and/or with at least one upstream extending recess 16B designed at least approximately or at least in some areas with a sharp edge, in order to configure the trailing edges 16 and 17 at least approximately serrated and to impart to the airflow as it leaves the guide elements 14 and 15 so-called trailing edge vortices, by which an improved mixing between the air routed in the engine core 5 and the fuel supplied in the area of the device 9 is assured.

By designing the guide elements 14 and 15 with projections and/or recesses, the guide elements 14 and 15 are, compared with guide elements known from the state of the art and designed with straight trailing edges, provided with a regularly or irregularly serrated trailing edge in order to prevent fuel accumulations downstream of the guide elements.

The number of serrations formed by the projections and recesses in the area of the trailing edges 16 and 17, their positioning relative to one another, i.e. a distance A between two serrations, a serration depth T and angles B and C of the serration flanks, are selected depending on the respective application in order to achieve the most thorough possible mixing of air and fuel particularly also in the wake areas of the guide elements 14, 15.

A good degree of mixing is achieved in particular when the serrations formed by the projections and/or recesses of the guide elements 14, 15 in the area of the trailing edges 16, 17 are designed at least in some areas triangular and/or trapezoidal and have sharp edges. The trapezoidally shaped projections have two downstream sharp edges separated by the truncated plateau area. Wave-like trailing edges, i.e. round shapes and edges, are less suited for formation of trailing edge vortices improving the degree of mixing downstream of the guide elements 14 and 15 when compared to sharply tapering serrations.

FIGS. 5 to 12 each show different embodiments of a guide element 14 designed in the area of its trailing edge 16 with a different number of projections and/or recesses and with differently designed serrations in each case.

FIG. 12 shows a three-dimensional view of a guide element 14 with serrated trailing edge 16 that represents a profiled cascade with a blade profile. The trailing edge vortices 18 created in the area of the serrated trailing edge 16 improve mixing of fuel 19 and air, since the wake area 20 arranged downstream of the guide element 14 can interact with the unobstructed flow 21 in the jet engine 1. This results from the fact that the trailing edge vortices 18 break up the shear layer 22 known from the state of the art and lead to a more homogeneous distribution of the air/fuel mixture and hence to more efficient and effective combustion.

LIST OF REFERENCE NUMERALS

1 Jet engine
2 Bypass duct
3 Inlet area
4 Fan
5 Engine core
6 Compressor arrangement
7 Burner
8 Turbine arrangement
9 Device
11, 12 Air-carrying duct
10, 13 Fuel-carrying duct
14, 15 Guide element
16 Trailing edge
16A Projection
16B Recess
17 Trailing edge
17A Projection
18 Trailing edge vortex
19 Fuel
20 Wake area
21 Unobstructed flow
22 Shear layer

What is claimed is:

1. A fuel injector for mixing fuel and air of a jet engine, comprising:
    at least one air-carrying duct of the fuel injector;
    at least one further fuel-carrying duct for supplying fuel into a combustion chamber;
    guide elements provided at least in the air-carrying duct and extending over an entire height from a radially inner wall to a radially outer wall of the air-carrying duct and distributed over a circumference of the air-carrying duct for imparting a twist to air flowing in the air-carrying duct; each guide element having a trailing edge area with at least one of a downstream extending projection or an upstream projecting recess, the at least one of the projection or the recess having a portion configured at least approximately as a sharp edge, the trailing edge area improving mixing between the air and fuel downstream of the ducts, the at least one of the projection or the recess creating at least one open passage from a first surface of the guide element to an opposite second surface of the guide element upstream of a downstreammost edge of the guide element.

2. The device of claim 1, wherein the at least one projection or recess is triangular at least in some areas.

3. The device of claim 2, wherein the at least one projection or recess is trapezoidal at least in some areas.

4. The device of claim 3, wherein each guide element includes a plurality of projections and recesses, and a shape and spacing of the projections and recesses at least partly vary from one another.

5. The device of claim 3, wherein each guide element includes a plurality of projections and recesses, and a shape and spacing of the projections and recesses, respectively are identical to one another.

6. The device of claim 5, wherein the air-carrying duct is an annular duct and surrounds the fuel-carrying duct.

7. The device of claim 6, comprising at least two concentrically arranged annular air-carrying ducts surrounding the fuel-carrying duct.

8. The device of claim 1, wherein the at least one projection or recess is trapezoidal at least in some areas.

9. The device of claim 8, wherein each guide element includes a plurality of projections and recesses, and a shape and spacing of the projections and recesses at least partly vary from one another.

10. The device of claim 8, wherein each guide element includes a plurality of projections and recesses, and a shape and spacing of the projections and recesses, respectively are identical to one another.

11. The device of claim 10, wherein the air-carrying duct is an annular duct and surrounds the fuel-carrying duct.

12. The device of claim 9, wherein the air-carrying duct is an annular duct and surrounds the fuel-carrying duct.

13. The device of claim 1, comprising at least two concentrically arranged annular air-carrying ducts surrounding the fuel-carrying duct.

14. The device of claim 2, wherein each guide element includes a plurality of projections and recesses, and a shape and spacing of the projections and recesses at least partly vary from one another.

15. The device of claim 2, wherein each guide element includes a plurality of projections and recesses, and a shape and spacing of the projections and recesses, respectively are identical to one another.

16. The device of claim 15, wherein the air-carrying duct is an annular duct and surrounds the fuel-carrying duct.

17. The device of claim 14, wherein the air-carrying duct is an annular duct and surrounds the fuel-carrying duct.

18. The device of claim 1, wherein the air-carrying duct is an annular duct and surrounds the fuel-carrying duct.

19. The device of claim 4, wherein the air-carrying duct is an annular duct and surrounds the fuel-carrying duct.

20. A fuel injector for mixing fuel and air of a jet engine, comprising:
   at least one air-carrying duct of the fuel injector;
   at least one further fuel-carrying duct for supplying fuel into a combustion chamber;
   guide elements provided at least in the air-carrying duct and extending over an entire height from a radially inner wall to a radially outer wall of the air-carrying duct and distributed over a circumference of the air-carrying duct for imparting a twist to air flowing in the air-carrying duct; each guide element having a serrated trailing edge with sharp edged serrations, the serrated trailing edge improving mixing between the air and fuel downstream of the ducts.

* * * * *